United States Patent
Komatsu et al.

(10) Patent No.: US 12,206,295 B2
(45) Date of Patent: Jan. 21, 2025

(54) ROTATING ELECTRIC MACHINE SYSTEM HAVING A CONTROL CIRCUIT THAT ESTIMATES AN INTERNAL STATE

(71) Applicant: Mitsubishi Electric Corporation, Tokyo (JP)

(72) Inventors: Taiga Komatsu, Tokyo (JP); Yuki Hidaka, Tokyo (JP); Hideaki Arita, Tokyo (JP); Kenji Kato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 251 days.

(21) Appl. No.: 17/791,233

(22) PCT Filed: Feb. 20, 2020

(86) PCT No.: PCT/JP2020/006859
§ 371 (c)(1),
(2) Date: Jul. 7, 2022

(87) PCT Pub. No.: WO2021/166177
PCT Pub. Date: Aug. 26, 2021

(65) Prior Publication Data
US 2023/0032445 A1    Feb. 2, 2023

(51) Int. Cl.
*H02K 11/215* (2016.01)
*G01K 13/08* (2006.01)
*H02K 11/25* (2016.01)

(52) U.S. Cl.
CPC ............ *H02K 11/25* (2016.01); *G01K 13/08* (2013.01); *H02K 11/215* (2016.01)

(58) Field of Classification Search
CPC ...... H02K 11/25; H02K 11/215; H02K 11/35; H02K 11/24; G01K 13/08
See application file for complete search history.

(56) References Cited

U.S. PATENT DOCUMENTS

| | | | |
|---|---|---|---|
| 2002/0038192 A1* | 3/2002 | Klaar | G01K 13/08 702/132 |
| 2011/0273121 A1* | 11/2011 | Wan | H02K 5/225 310/71 |
| 2017/0170773 A1* | 6/2017 | Donolo | G05B 19/4062 |

FOREIGN PATENT DOCUMENTS

| | | |
|---|---|---|
| JP | 54-104501 A | 8/1979 |
| JP | 60-96981 U | 7/1985 |
| JP | 2002-539753 A | 11/2002 |
| JP | 2005-133807 A | 5/2005 |
| JP | 2010-35265 A | 2/2010 |

OTHER PUBLICATIONS

JP2010035265A English translation (Year: 2024).*

(Continued)

*Primary Examiner* — Christopher M Koehler
*Assistant Examiner* — Viswanathan Subramanian
(74) *Attorney, Agent, or Firm* — XSENSUS LLP

(57) ABSTRACT

An object is to improve estimation accuracy of the internal distribution state of a rotating electric machine. The rotating electric machine includes a stator; a rotor rotatably provided on a radially inner side of the stator; a shaft provided as a rotary shaft of the rotor; a bracket supporting the shaft rotatably relative to the stator via a bearing; and a sensor provided to the shaft between the rotor and the bearing.

16 Claims, 11 Drawing Sheets

(56) References Cited

OTHER PUBLICATIONS

JP2005133807A English translation (Year: 2024).*
International Search Report and Written Opinion mailed on Apr. 21, 2020, received for PCT Application PCT/JP2020/006859, filed on Feb. 20, 2020, 9 pages including English Translation.
Office Action issued on Jun. 6, 2024, in corresponding Chinese patent Application No. 202080096441.X, 16 pages.

* cited by examiner

ROTATING ELECTRIC MACHINE SYSTEM HAVING A CONTROL CIRCUIT THAT ESTIMATES AN INTERNAL STATE

CROSS-REFERENCE TO RELATED APPLICATION

The present application is based on PCT filing PCT/JP2020/006859, filed Feb. 20, 2020, the entire contents of which is incorporated herein by reference.

TECHNICAL FIELD

The present invention relates to a rotating electric machine having a sensor at a shaft.

BACKGROUND ART

Conventionally, there has been known a configuration in which an inner hole is provided along the axis of a rotor shaft, an abnormal sound detection sensor and a transmitter are provided at the inner hole, and a signal is transmitted to a transmission antenna provided on the rotor shaft (for example, Patent Document 1).

In addition, there has been known a configuration in which a torsion detector is provided in a hollow output shaft and a lead wire formed in a helical shape is connected to the torsion detector and led through a hollow input shaft (see, for example, Patent Document 2).

CITATION LIST

Patent Document

Patent Document 1: Japanese Laid-Open Patent Publication No. 54-104501
Patent Document 2: Japanese Laid-Open Utility Model Publication No. 60-096981

SUMMARY OF THE INVENTION

Problems to be Solved by the Invention

However, in the above rotating electric machines, a sensor is provided in a hollow of a hollow shaft. Therefore, attachment thereof is not easy and thus there is a problem that estimation accuracy for the internal distribution state is lowered.

The present invention has been made to solve the above problem, and an object of the present invention is to provide a rotating electric machine that enables improvement in estimation accuracy for the internal distribution state of a motor, with a simple configuration.

Solution to the Problems

A rotating electric machine system according to the present disclosure includes: a rotating electric machine; and a control unit for controlling power to be supplied to the rotating electric machine, the rotating electric machine including a stator, a rotor rotatably provided on a radially inner side of the stator, a shaft provided as a rotary shaft of the rotor, a bracket supporting the shaft rotatably relative to the stator via a bearing, and a sensor provided to the shaft between the rotor and the bearing. The control unit estimates an internal state of the rotating electric machine on the basis of a thermal network model and temperature information of the shaft between the rotor and the bearing acquired by the sensor.

Effect of the Invention

The rotating electric machine according to the present disclosure enables improvement in estimation accuracy for the internal distribution state of the rotating electric machine, with a simple configuration.

DESCRIPTION OF EMBODIMENTS

Embodiment 1

A rotating electric machine according to embodiment 1 of the present disclosure will be described.

Figure 1:
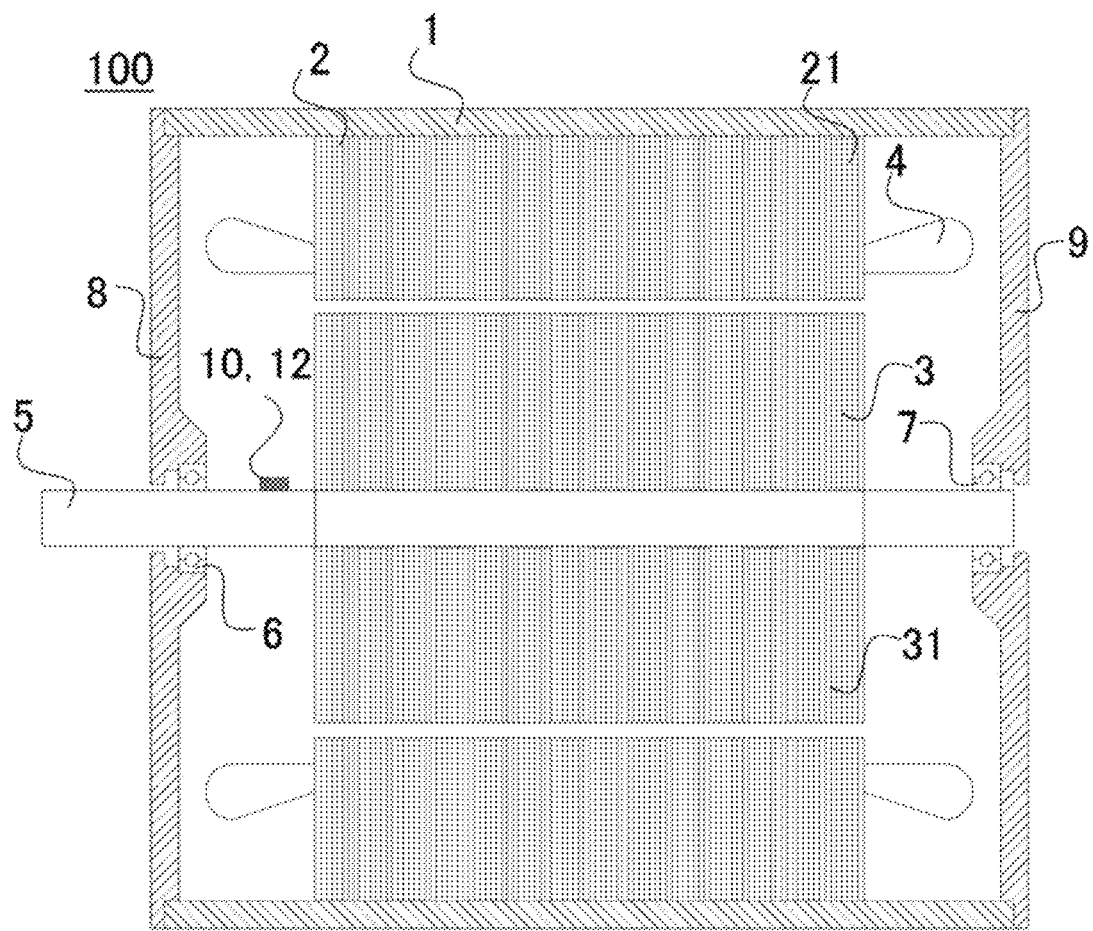
FIG. 1 is a vertical sectional view showing a rotating electric machine according to embodiment 1 of the present disclosure.

FIG. 1 is a vertical sectional view showing the rotating electric machine according to embodiment 1 of the present disclosure. A direction parallel to the axis of the rotary shaft is defined as a rotary shaft direction or an axial direction, and the axis of the rotary shaft is defined as a center axis. A direction perpendicular to the axis of the rotary shaft is defined as a radial direction. An outer side in the radial direction is defined as a radially outer direction or a radially outer side, and an inner side in the radial direction is defined as a radially inner direction or a radially inner side. A direction of rotation around the rotary shaft is defined as a circumferential direction or a rotational direction, and a direction opposite to the rotational direction is defined as a counter-rotational direction.

A rotating electric machine 100 according to embodiment 1 of the present disclosure includes a cylindrical frame 1, a stator 2 inserted and retained in the frame 1, and a rotor 3 rotatably provided on the radially inner side of the stator 2 so as to be spaced from the stator 2 via a gap serving as a magnetic gap. The stator 2 and the rotor 3 are provided coaxially with each other.

The stator 2 includes a stator core 21 and a stator coil 4. The stator core 21 is formed from a magnetic material such as an electromagnetic steel sheet or a dust core, for example. The stator coil 4 is fixed to the stator core 21 via a component such as a bobbin or insulation paper (not shown).

The rotor 3 includes a rotor core 31. As in the stator core 21, the rotor core 31 is formed from a magnetic material such as an electromagnetic steel sheet or a dust core, for example. The rotor core 31 is fastened to the shaft 5 by press fit, shrink fit, or key insertion, for example. That is, the shaft 5 is provided as a rotary shaft of the rotor 3. Thus, motive power can be transmitted between the rotor core 31 and the shaft 5.

The frame 1 is provided with a first bracket 8 and a second bracket 9 on the outer sides in the axial direction of the stator 2 and the rotor 3 so as to close both ends in the axial direction of the frame 1. The first bracket 8 has a first bearing 6 and the second bracket 9 has a second bearing 7. The first bracket 8 supports the shaft 5 rotatably via the first bearing 6. The second bracket 9 supports the shaft 5 rotatably via the second bearing 7. Here, a side near the axial end of the shaft 5 where motive power is transmitted in the axial direction of the shaft 5 is defined as a load side, and the opposite side is defined as a counter-load side. In this case, the first bracket 8 is on the load side and the second bracket 9 is on the counter-load side. It is noted that both sides may be load sides. In a case where both sides are load sides, one side is referred to as a load side and the other side is referred to as a counter-load side, for convenience sake.

The shaft 5 is solid and has a sensor 10 and a transmission unit 12 at the radially outer surface thereof. Of the shaft 5, a shaft part to which the sensor 10 is attached is present in a space surrounded by the frame 1, the first bracket 8, and the second bracket 9. More specifically, the sensor 10 is provided to the shaft 5 between the rotor core 31 and the first bearing 6. The shaft 5 is solid in a direction toward the axis of the shaft 5 from the position where the sensor 10 is attached.

The sensor 10 and the transmission unit 12 are electrically connected to each other. Thus, information detected by the sensor 10 is sent to the transmission unit 12. As the sensor 10, a thermocouple which is a temperature sensor for measuring a temperature is used, for example. The sensor 10 generates voltage in accordance with the temperature of the part at which the sensor 10 is attached, by Seebeck effect. Thus, the temperature of the shaft 5 can be measured. That is, a temperature transferred from the stator 2, the rotor 3, and the like to the shaft 5 can be measured.

Figure 2:
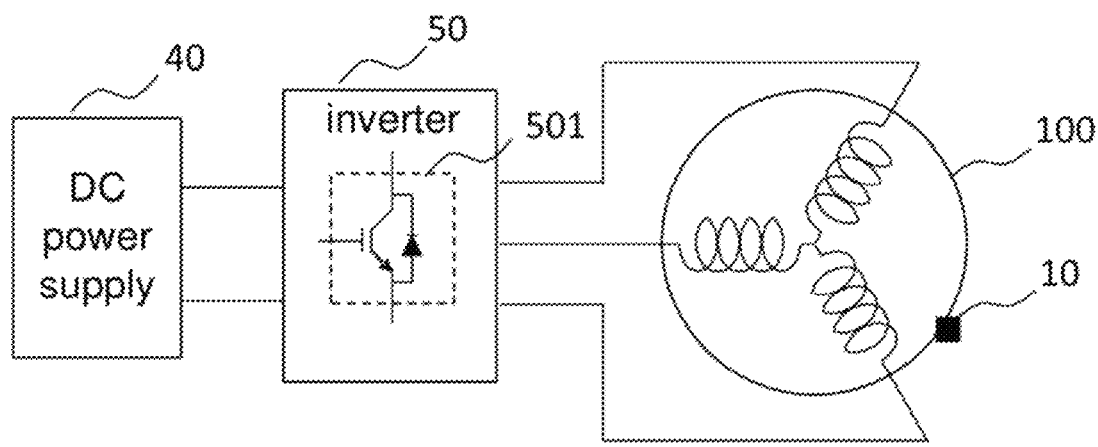
FIG. 2 is a schematic diagram showing a system in which the rotating electric machine according to embodiment 1 of the present disclosure is incorporated.

Here, operation of the rotating electric machine 100 will be described. FIG. 2 is a schematic diagram showing a system in which the rotating electric machine 100 is incorporated.

As shown in FIG. 2, the system in which the rotating electric machine 100 is incorporated includes the rotating electric machine 100, a DC power supply 40, and an inverter 50.

The DC power supply 40 and the inverter 50 are electrically connected to each other, and the inverter 50 is supplied with electric energy from the DC power supply 40. The inverter 50 and the stator coil 4 of the rotating electric machine 100 are electrically connected to each other, and current is applied to the stator coil 4 by the inverter 50. Specifically, a switching element 501 that the inverter 50 has undergoes switching control, whereby desired current is applied to the stator coil 4. Current supplied from the inverter 50 to the rotating electric machine 100 depends on the type of the rotating electric machine 100, and for example, AC current is supplied for a three-phase motor or DC current is supplied for a DC motor.

When current is applied to the stator coil 4 of the rotating electric machine 100, a rotating magnetic field is generated in the rotating electric machine 100. The rotor 3 is subjected to the rotating magnetic field, thus generating torque. The torque is transmitted to the shaft 5, whereby motive power can be transmitted to the outside from the axial end of the shaft 5.

When the rotating electric machine 100 is operated by current being applied to the stator coil 4 as described above, loss called copper loss occurs in the stator coil 4. In addition, in the stator core 21 and the rotor core 31 formed from a magnetic material, magnetic flux variation occurs. Then, eddy current is caused by the magnetic flux variation. As a result, loss occurs in the stator core 21 and the rotor core 31. Further, due to hysteresis of magnetic characteristics of the magnetic material, hysteresis loss is caused by the magnetic flux variation. These losses cause temperature increase at parts inside the rotating electric machine 100. If the temperature of the rotating electric machine 100 becomes higher than in an initial state such as before current application, the degree of temperature increase during operation becomes great. Therefore, in a case where protection for components inside the rotating electric machine 100 is needed, it is necessary to reduce the power supply amount to the rotating electric machine 100 or stop supply of power, for example.

Figure 3:
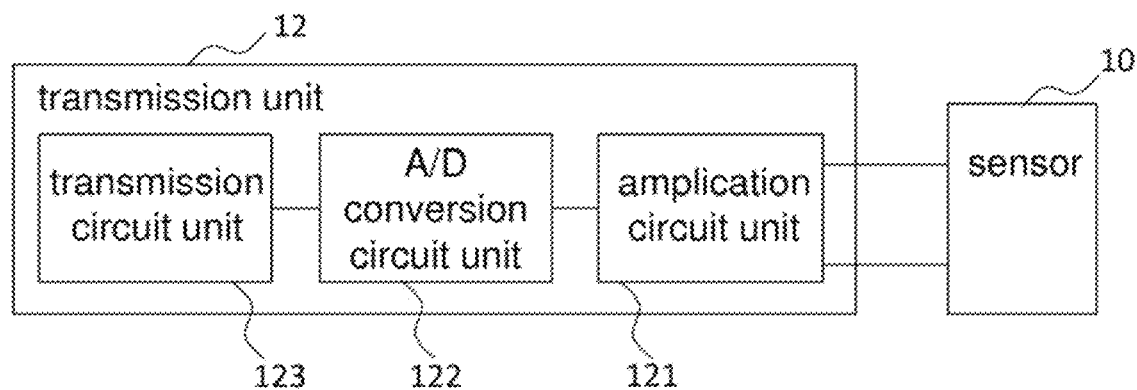
FIG. 3 is a schematic diagram of a sensor and a transmission unit according to embodiment 1 of the present disclosure.

In the rotating electric machine according to embodiment 1 of the present disclosure, information about temperature increase inside the rotating electric machine 100 as described above is measured by the sensor 10 and then is outputted using the transmission unit 12. Specific description will be given with reference to FIG. 3. FIG. 3 is a schematic diagram of the sensor and the transmission unit according to embodiment 1 of the present disclosure.

As described above, the sensor 10 and the transmission unit 12 are attached to the radially outer surface of the shaft 5 at a position between the first bearing 6 and the rotor core 31.

As shown in FIG. 3, the transmission unit 12 includes an amplification circuit unit 121, an A/D conversion circuit unit 122, and a transmission circuit unit 123. A signal detected by the sensor 10 is amplified by the amplification circuit unit 121. The signal amplified by the amplification circuit unit 121 is converted from an analog signal to a digital signal by the A/D conversion circuit unit 122. The digital signal converted by the A/D conversion circuit unit 122 is transmitted to a reception unit (not shown) by the transmission circuit unit 123.

Transmission from the transmission circuit unit 123 to the reception unit is performed by wireless communication such as Wi-Fi (registered trademark) or Bluetooth (registered trademark), for example. The digital signal received by the reception unit as described above is used in deriving the internal temperature distribution of the rotating electric machine 100 by a thermal network model, for example.

In a case of forming a thermal network model of the rotating electric machine 100, it is general to form a model composed of parts such as the stator 2 and the rotor 3 where loss occurs inside the rotating electric machine 100. In a case of estimating the internal temperature of the rotating electric machine 100 using temperature information around the rotor core 31, it is desirable to acquire temperature information of the rotor core 31 more accurately, because this contributes to estimation accuracy. In addition, in a case of acquiring temperature information around the rotor core 31 and using the formed thermal network model, it is desirable to acquire temperature information at an appropriate position considering the way of heat transfer from the rotor core 31 to another part and heat releasing via air or the like.

Conventionally, there has been no case where a temperature sensor is provided at a hollow part of a hollow shaft. In the aforementioned conventional documents, a sensor is provided at a hollow part of a hollow shaft and it is not assumed that information acquired by the sensor is used for estimation of the internal state of the motor using a thermal network model. In addition, since the shaft is a part serving as a rotary shaft of a rotary body of the rotating electric machine, a configuration in which a hollow shaft is used and a sensor is provided thereto has a reduced shaft strength as compared to a solid shaft. In order to keep the strength, it is conceivable that the thickness of the hollow shaft is increased. However, increasing the thickness of the hollow increases the diameter of the shaft itself, and as a result, the size of the rotating electric machine is enlarged. In addition, if a temperature sensor is provided at a hollow part, since temperature distribution arises in a hollow shaft thickness part, temperature difference is likely to arise as compared to the shaft surface, and also, since there is a certain time constant, detection is delayed relative to start of temperature increase. Therefore, it might be impossible to perform accurate measurement, depending on the thickness of the hollow shaft or the like. In addition, it is difficult to consider heat released from the rotor core 31 or the like via air and therefore it is difficult to acquire accurate temperature information.

In addition, for example, in a case where a temperature sensor is provided at a certain part of the rotor core 31 to acquire the temperature, temperature information about the part where the temperature sensor is provided can be acquired. However, in performing control or the like using the temperature information, measured information for not the entire rotating electric machine 100 but only a certain part is to be used. Therefore, there is a possibility that the control depends on only the temperature at a certain part where heat transfer is not taken into consideration. Specifically, the temperature at a certain part is monitored at each time and temperature information is taken into the control as needed, whereby whether the temperature at the certain part exceeds a threshold is determined. Then, when it is determined that the temperature exceeds the threshold, operation such as reducing a current application amount or stop current application is performed so that the temperature at the certain part will not increase any more.

In the rotating electric machine 100 according to the present disclosure, the sensor 10 is attached to the solid shaft 5 between the rotor 3 and the first bearing 6. In the case of a hollow shaft, the entire size of the rotating electric machine is enlarged for keeping the strength, whereas in the case of the solid shaft 5, it is possible to easily acquire temperature information at a position just close to the rotor core 31 while keeping the strength without changing the diameter of the shaft 5 or the entire size of the rotating electric machine 100. Heat transferred from the rotor core 31 through the shaft 5 transfers to the first bearing 6 and the first bracket 8 as shown by arrows in FIG. 4. Therefore, when the sensor 10 is attached to the shaft 5 between the first bearing 6 and the rotor core 31, it is possible to more accurately measure the temperature of the shaft 5 just close to the rotor 3 as a boundary of the thermal network model without considering branching of heat transfer. Then, using the temperature information acquired by the sensor 10 as a boundary condition, calculation can be performed by the thermal network model. Through calculation by the thermal network model, control for updating the temperature information as needed is performed, and in addition, temperature change in the future is predicted and control is performed on the basis of the prediction. Thus, the control range of the rotating electric machine 100 can be expanded.

Further, the sensor 10 is attached to the radially outer surface of the shaft 5. The part of the shaft 5 to which the sensor 10 is attached is present in a space surrounded by the frame 1, the first bracket 8, and the second bracket 9. Thus, heat transferring from the shaft 5 via air in the space can be taken into consideration.

Thus, in the case where the sensor 10 is attached to the shaft 5 to acquire the temperature as in embodiment 1 of the present disclosure, it becomes possible to improve accuracy for the internal temperature of the rotating electric machine 100 with a simple configuration.

In addition, transmission is performed through wireless communication using the transmission unit 12 having the transmission circuit unit 123. Thus, even if the reception unit is present at a remote location, it becomes possible to perform communication without a risk of disconnection, thus improving communication reliability. In addition, in the case of wireless communication, a mechanism for transfer between members that rotate relative to each other is not needed, and information can be transferred with a simple configuration.

In the above description, the case where the rotor 3 has the rotor core 31 and the shaft 5 has been shown. However, a magnet or a secondary conductor (not shown) may be provided at one or both of the inside of the rotor core 31 and the radially outer surface of the rotor core 31. In the case of providing a magnet, it is possible to improve output torque, in addition to the effect of enabling improvement in accuracy for the internal temperature of the rotating electric machine 100. Further, in the case of providing a magnet, an end plate for retaining the magnet or the like may be provided at an axial end of the rotor core 31. Retaining the magnet by the end plate can prevent the magnet from coming off.

Figure 4:
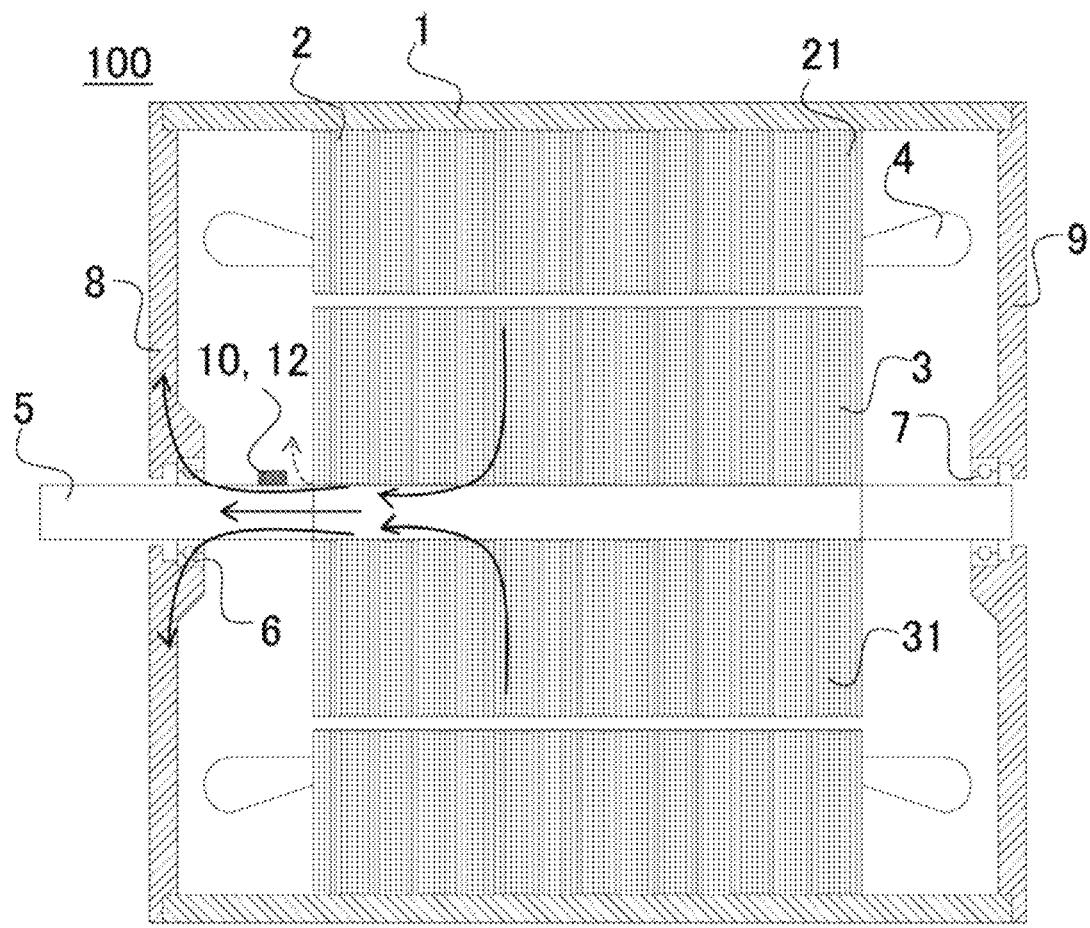
FIG. 4 is a vertical sectional view showing the rotating electric machine according to embodiment 1 of the present disclosure.

In FIG. 1 and FIG. 4, the first bearing 6 and the second bearing 7 are shown as ball bearings. However, slide bearings may be used. It is possible to support the shaft 5 even by slide bearings, and heat from the shaft 5 transfers to the bearings and housing parts as described above. Thus, an effect of enabling improvement in accuracy for the internal temperature of the rotating electric machine 100 is provided in the same manner.

In the above description, the case where the sensor 10 is attached to the shaft 5 at a position between the first bearing 6 and the rotor core 31, has been shown. However, the sensor 10 may be attached to the shaft 5 at a position between the second bearing 7 and the rotor core 31. Also on the counter-load side, heat transfers from the rotor core 31 to the shaft 5 similarly to the load side. Therefore, temperature information can be acquired and accuracy for the internal temperature of the rotating electric machine 100 can be improved.

In the above description, the case where the system in which the rotating electric machine 100 is incorporated includes the rotating electric machine 100, the DC power supply 40, and the inverter 50, has been shown. However, depending on the type of the rotating electric machine 100, the inverter 50 may not necessarily be provided. For example, in a case where the motor is a general three-phase motor or a DC motor, i.e., the rotating electric machine operates by being directly connected to a power supply of a grid not via the inverter 50, it is possible to configure the system without providing the inverter 50.

The sensor 10 and the transmission unit 12 are provided adjacently to each other, but the arrangement is not limited thereto. For example, while the sensor 10 is provided between the first bearing 6 and the rotor core 31, the transmission unit 12 may be provided at a position different from the sensor 10 which is provided inside the space surrounded by the frame 1, the first bracket 8, and the second bracket 9, e.g., at a part on the frame 1, each bracket, the shaft 5, or the like outside the space. Thus, it is possible to transmit information without being influenced by metal parts forming the rotating electric machine 100, i.e., without being influenced by the surrounding environment. In this case, for example, the sensor 10 and the transmission unit 12 may be connected via a lead wire. Also in such cases, it becomes possible to improve accuracy for the internal temperature of the rotating electric machine 100 in the same manner.

In the above description, the case where the transmission unit 12 transmits a signal to the reception unit through wireless communication using the transmission circuit unit 123 has been shown. However, the transmission unit 12 may conform to a communication standard other than the described one, or non-standard communication may be adopted. In addition, although the signal is amplified by the amplification circuit unit 121 in the above description, the signal may not necessarily be amplified, and the signal may be passed as it is. In addition, although conversion from an analog signal to a digital signal is performed by the A/D conversion circuit unit 122 in the above description, the analog signal may be transmitted through wireless communication. Also in such cases, it becomes possible to improve accuracy for the internal temperature of the rotating electric machine 100 in the same manner.

In the above description, the case where the sensor 10 is a thermocouple which is a temperature sensor, has been shown. However, instead of the temperature sensor or in combination with the temperature sensor, a strain gauge or a magnetic sensor may be used. The strain amount is larger at the shaft surface than at a hollow of a shaft. Therefore, by providing the sensor at the surface of the shaft 5 and measuring strain, it becomes possible to acquire the strain amount more accurately. In addition, also for the magnetic sensor, detection is easier at the surface of the shaft 5 than in a hollow of a hollow shaft, and more accurate measurement can be performed there.

Besides, instead of the above sensors or in combination therewith, a vibration sensor or a pressure sensor may be used. In the above description, the case where the internal temperature distribution of the rotating electric machine 100 is derived by the thermal network model has been shown. However, in a case of using a sensor other than a temperature sensor, a physical model of the rotating electric machine 100 corresponding to a physical quantity to be measured by the applied sensor may be used instead of the thermal network model. Alternatively, a physical model of the rotating electric machine 100 corresponding to a physical quantity to be measured by the applied sensor may be used in combination with the thermal network model. Thus, the internal distribution state of the rotating electric machine 100 can be derived and it becomes possible to improve accuracy for the internal temperature of the rotating electric machine 100.

Embodiment 2

Figure 5:
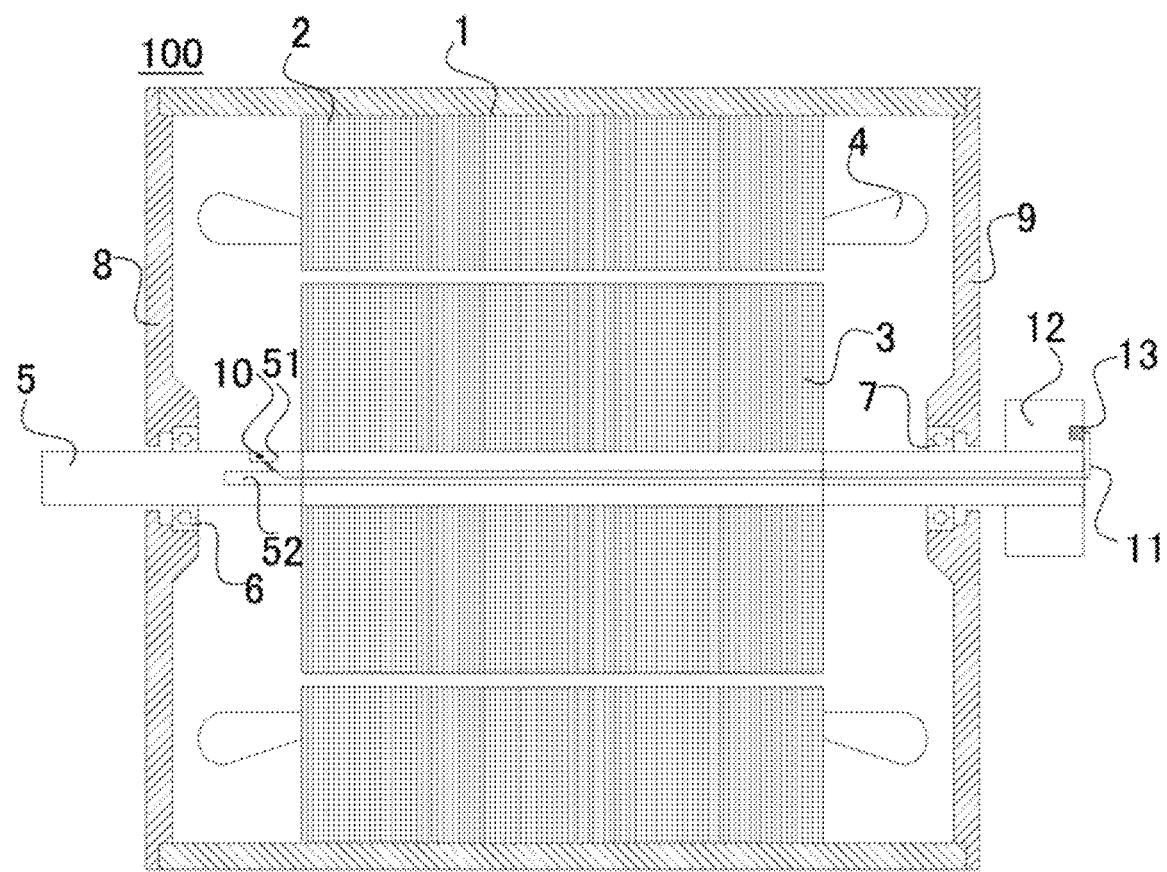
FIG. 5 is a vertical sectional view showing a rotating electric machine according to embodiment 2 of the present disclosure.

A rotating electric machine according to embodiment 2 of the present disclosure will be described. The same reference characters as in FIG. 1 to FIG. 4 denote the same or corresponding parts and the description thereof is omitted. Only differences from embodiment 1 will be described. FIG. 5 is a vertical sectional view showing the rotating electric machine according to embodiment 2 of the present disclosure. For convenience in description, the shaft 5 in FIG. 5 is shown in a state of not being cut.

In the rotating electric machine 100 according to embodiment 2 of the present disclosure, as shown in FIG. 5, the shaft 5 has, between the first bearing 6 and the rotor core 31, a recess 51 recessed to the radially inner side from the radially outermost surface of the shaft 5. The recess 51 is formed at only a certain part in the rotational direction of the shaft 5, by a machining center, for example. Then, the sensor 10 is stored at the radially outer surface of the recess 51. The shaft 5 to which the sensor 10 is provided is solid toward the axis of the shaft 5 from the sensor 10. While the shaft 5 may be solid toward the axis of the shaft 5 from the sensor 10, if the shaft 5 is solid in a cylindrical part whose radius is the distance from the axis to the provided position of the sensor 10, the strength becomes higher.

In addition, the shaft 5 has a shaft groove 52 at the radially outer surface thereof. That is, the shaft groove 52 is recessed from the vicinity of the recess 51 of the shaft 5 toward the radially inner side and extends in the axial direction to the counter-load side.

The transmission unit 12 is attached to the counter-load side of the shaft 5 and is fastened to the shaft 5. Therefore, the transmission unit 12 is linked with rotation of the shaft 5. With this structure, the sensor 10 present on the load side and the transmission unit 12 present on the counter-load side are connected via the rotor 3. More specifically, the transmission unit 12 is provided with a lead wire receptor portion 13. The lead wire receptor portion 13 is connected to a lead wire 11. Accordingly, the lead wire 11 is led through the shaft groove 52 of the shaft 5 so as to be led out from the counter-load side end in the axial direction of the shaft 5. The lead wire receptor portion 13 is connected to a terminal for receiving a signal from the thermocouple, and a terminal of the transmission unit 12.

A signal detected by the sensor 10 is transmitted via the lead wire 11. The transmitted signal is received by the lead wire receptor portion 13 and is passed to the transmission unit 12. Then, the transmission unit 12 converts the signal and transmits the converted signal by wireless communication, through the A/D conversion circuit unit 122 and the transmission circuit unit 123.

The rotating electric machine 100 according to embodiment 2 of the present disclosure is configured such that the sensor 10 is stored in the recess 51 of the shaft 5. Thus, the influence when the sensor 10 is exposed to air inside the rotating electric machine 100 can be reduced. Therefore, it becomes possible to accurately acquire information about the surface of the shaft 5 just close to the rotor core 31. In addition, since the shaft 5 is solid toward the axis from the attachment position of the sensor 10, the strength of the shaft 5 is kept. Therefore, the diameter of the shaft 5 need not be increased, so that the entire size of the rotating electric machine 100 need not be changed. In addition, as long as a cylindrical part whose radius is the distance from the attachment position of the sensor 10 to the axis is solid, temperature distribution in a thickness part as in a hollow shaft does not arise, and detection can be performed earlier from the start of temperature increase. Thus, it becomes possible to improve accuracy for the internal temperature of the rotating electric machine 100 with a simple configuration.

In embodiment 2 of the present disclosure, the case where the transmission unit 12 is provided on the counter-load side of the shaft 5 has been shown. However, without limitation to this configuration, the transmission unit 12 may be provided on the load side as in embodiment 1 of the present disclosure. In this case, when wireless communication is performed as in embodiment 1, the lead wire 11, and the shaft groove 52 and the lead wire receptor portion 13 needed for the lead wire 11, need not be provided. Thus, information can be acquired with a simpler configuration. As another configuration, the transmission unit 12 may be provided on the outer side in the axial direction of the first bracket 8. In this case, the axial-direction length of the shaft groove 52 for leading out the lead wire 11 can be shortened and thus a part to be worked on the shaft 5 can be reduced.

In the above description, the case where the lead wire 11 is merely led along the shaft groove 52 has been shown. However, a member may be provided so as to cover the radially outer surfaces of the shaft groove 52 and the lead wire 11. Thus, the lead wire 11 can be retained. In the case of providing the member, the member may be placed such that the radially outermost surface thereof is at a position equal to the radially outermost surface of the shaft 5 or at a radially inner position therefrom. Thus, the member does not become an obstacle when the shaft 5 is placed through the bearings, so that assembling can be easily performed. In addition, if the material of the member is selected to be heavier than the material of the shaft 5 present in a case where the shaft groove 52 is not provided to the shaft 5, centrifugal force resistance can be improved.

A hole for the lead wire 11 may be provided so as to penetrate through a part of the solid shaft 5, and the lead wire 11 may extend through the inside of the hole. In the above description, the case where the recess 51 of the shaft 5 is formed at only a certain part in the rotational direction has been shown. However, the recess 51 is not limited thereto. For example, the recess 51 may be formed such that the shaft outer diameter is reduced over the entire circumference of the shaft 5. Also in such cases, the same effects as described above are provided.

Embodiment 3

Figure 6:
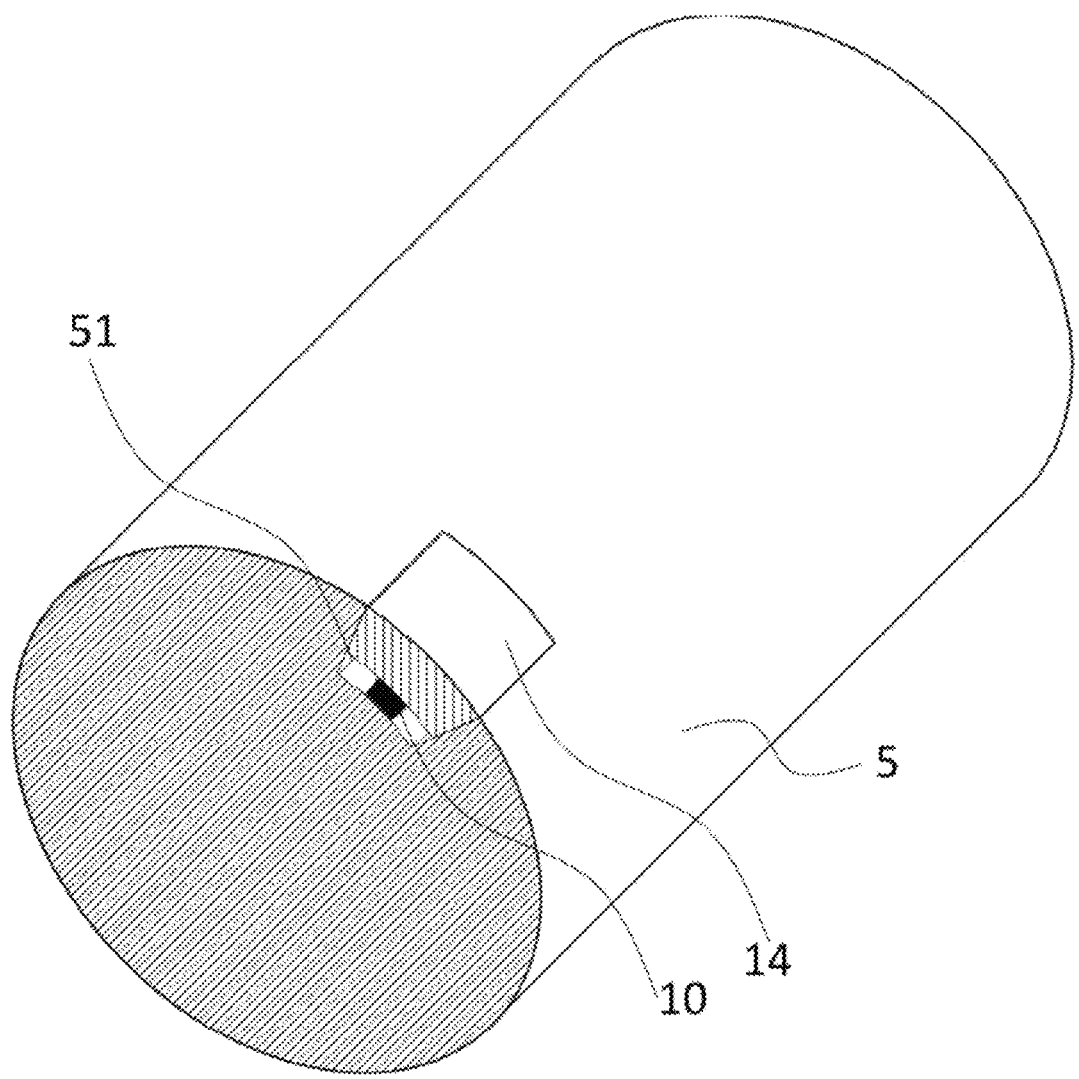
FIG. 6 is a perspective view when a part of a shaft of a rotating electric machine according to embodiment 3 of the present disclosure is cut.
Figure 7:
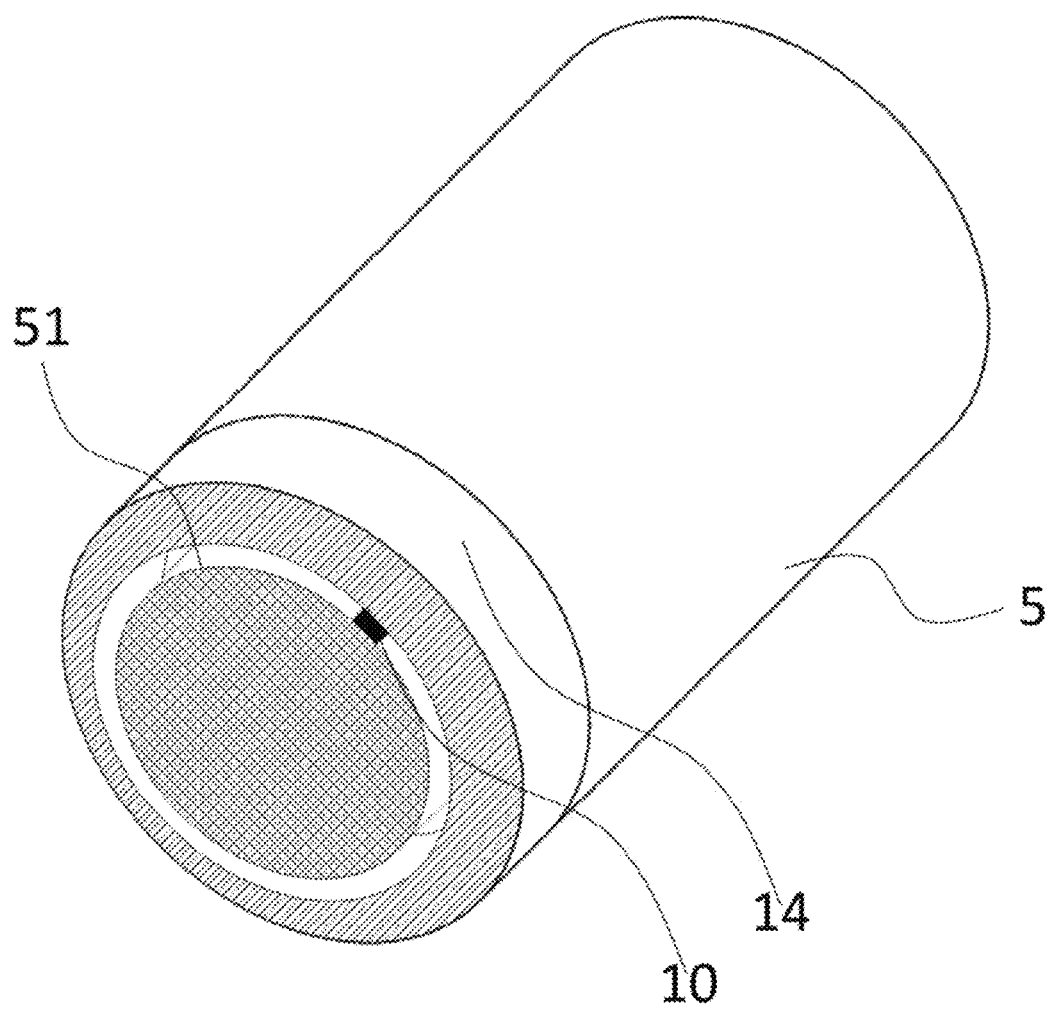
FIG. 7 is a perspective view showing a modification when a part of a shaft of the rotating electric machine according to embodiment 3 of the present disclosure is cut.

A rotating electric machine according to embodiment 3 of the present disclosure will be described. The same reference characters as in FIG. 1 to FIG. 5 denote the same or corresponding parts and the description thereof is omitted. Only differences from embodiments 1 and 2 will be described. FIG. 6 is a perspective view when a part of a shaft of the rotating electric machine according to embodiment 3 of the present disclosure is cut. FIG. 7 is a perspective view showing a modification when a part of a shaft of the rotating electric machine according to embodiment 3 of the present disclosure is cut. For convenience of description, only parts needed for description are shown while the other parts are not shown.

Specifically, FIG. 6 shows a view when the shaft 5 is cut along a plane perpendicular to the axial direction thereof at the axial-direction position of the shaft 5 where the sensor 10 is stored, and for convenience of description, some parts are not shown. In the rotating electric machine 100 according to embodiment 3 of the present disclosure, the sensor 10 is stored in the recess 51 formed in the shaft 5, as shown in FIG. 6. Further, a retention member 14 is provided on the radially outer side of the sensor 10.

The retention member 14 is, for example, made of a material such as metal or resin, and the radially outer surface thereof is formed in an arc shape. The retention member 14 retains the sensor 10 from the radially outer side. It is desirable that the radially outer surface of the retention member 14 in the retention state is flush with the radially outer surface of the shaft 5 or is at an inner position from the radially outer surface of the shaft 5. Thus, assembling can be smoothly performed. The retention member 14 itself is provided in the shaft 5 such that axial-direction movement of the retention member 14 is restricted by the shaft 5.

When the rotating electric machine 100 operates and the rotor 3 rotates, rotating parts of the rotating electric machine 100 are subjected to a centrifugal force. Since the sensor 10 provided to the shaft 5 is also subjected to the centrifugal force, the sensor 10 attempts to move toward the radially outer side during rotation of the rotating electric machine 100.

For ensuring sensing accuracy of the sensor 10, it is necessary to assuredly attach the sensor 10 to the shaft 5 which is a sensing target, even under the condition in which the sensor 10 is subjected to a centrifugal force due to rotation, or the like.

In embodiment 3 of the present disclosure, the retention member 14 is provided adjacently to the radially outer side of the sensor 10. Thus, the centrifugal force on the sensor 10 transfers to the retention member 14. Meanwhile, since the retention member 14 has an arc shape as shown in FIG. 6, the retention member 14 is deformed with a Young's modulus corresponding to the material thereof, resulting in having a shape slightly expanding on the radially outer side. That is, in the case where the retention member 14 has such a structure and dimensions that withstand the centrifugal force, the sensor 10 can be retained in a state in which the retention member is elastically deformed. Thus, by providing the sensor 10 at the radially outer surface of the shaft 5 and providing the retention member 14 on the radially outer side of the sensor 10, it becomes possible to prevent the sensor 10 from moving, separating from the shaft 5, or coming off toward the radially outer side of the shaft 5 due to the centrifugal force. Therefore, information can be stably acquired also during rotation.

Thus, with a simple configuration similar to embodiments 1 and 2 of the present disclosure, an effect of enabling improvement in accuracy for the internal temperature of the rotating electric machine 100 is provided, and in addition, reduction in estimation accuracy for the motor internal temperature can be suppressed.

In embodiment 3 of the present disclosure, the case where the recess 51 is provided at a part of the shaft 5, the sensor 10 is provided in the recess 51, and the radially outer surface thereof is covered by the retention member 14, has been shown. However, the present disclosure is not limited thereto. Any configuration may be adopted as long as the retention member 14 is provided on the radially outer side of the sensor 10. For example, as shown in FIG. 7, the recess 51 may be formed such that the diameter of the shaft 5 is reduced over the entire circumference of the shaft 5, and the retention member 14 having a tubular shape may be provided on the radially outer side of the recess 51. As long as a cylindrical part whose radius is the distance from the attachment position of the sensor 10 to the axis is solid, temperature distribution in a thickness part as in a hollow shaft does not arise, and detection can be performed earlier from the start of temperature increase.

The arc-shaped retention member 14 shown in FIG. 6 may have any shape that can be stored toward the radially inner side from the radially outer surface of the shaft 5, and therefore the radially outer side of the retention member 14 may be formed in a planar shape. Also in this case, an effect of preventing the sensor 10 from coming off toward the radially outer side is provided.

Embodiment 4

Figure 8:
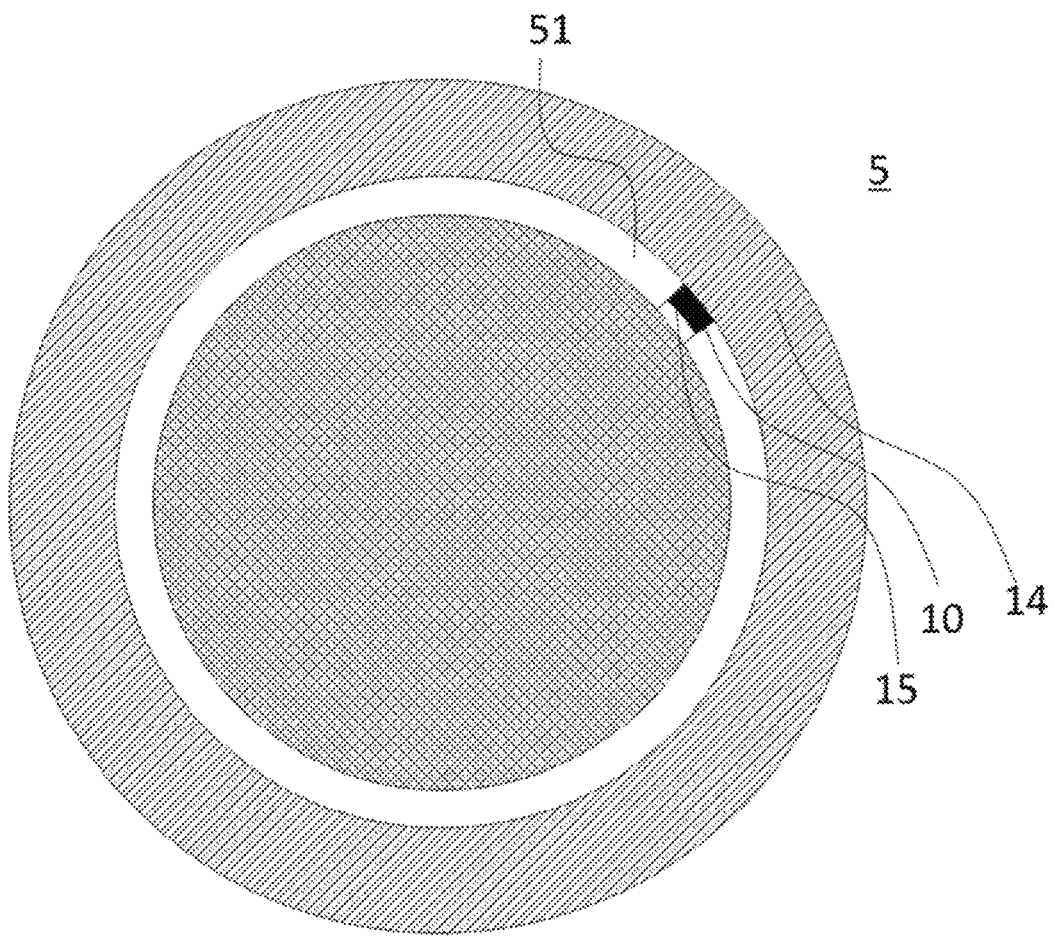
FIG. 8 is a sectional view taken along a direction perpendicular to the axial direction of a shaft of a rotating electric machine according to embodiment 4 of the present disclosure.

A rotating electric machine according to embodiment 4 of the present disclosure will be described. The same reference characters as in FIG. 1 to FIG. 7 denote the same or corresponding parts and the description thereof is omitted. Only differences from embodiments 1 to 3 will be described. FIG. 8 is a sectional view taken along a plane perpendicular to the axial direction of the shaft 5 at an axial-direction position of the shaft corresponding to a specific part of the rotating electric machine according to embodiment 4 of the present disclosure. For convenience of description, some parts are not shown.

In embodiment 4 of the present disclosure, the sensor 10 is stored in the recess 51 of the shaft 5. Here, the sensor 10 is fixed to the recess 51 of the shaft by an insulating member 15. The insulating member 15 is formed from a glass epoxy material, for example. By the sensor 10 being fixed to the shaft 5 via the insulating member 15, the sensor 10 and the shaft 5 are electrically insulated from each other. In addition, the insulating member 15 inhibits the sensor 10 from being separated from the shaft 5 during rotation of the rotating electric machine 100.

As described in embodiment 1 of the present disclosure, when current is applied to the stator coil 4 of the rotating electric machine 100, a rotating magnetic field is generated in the rotating electric machine 100. The rotor 3 is subjected to the rotating magnetic field, thus generating torque. At this time, shaft voltage can occur at the shaft 5 of the rotating electric machine 100. This is because a reverse electromotive force arises at the shaft depending on a current application pattern of current applied to the stator coil 4.

Here, it is assumed that the above shaft voltage occurs in a case where the shaft 5 and the sensor 10 are conductive to each other by direct contact not via the insulating member 15. At this time, the shaft 5 and the sensor 10 are at the same potential because they are conductive to each other. In addition, if, for example, the sensor 10 is conductive to the transmission unit 12 via the lead wire 11 and the reception unit (not shown) is electrically connected to the transmission unit 12, a phenomenon in which voltage of the reception unit (not shown) becomes abnormally high can occur. At this time, if the shaft voltage becomes higher than the withstand voltage value of the reception unit, there is a possibility that a circuit for measuring a sensor signal fails. Therefore, it is desirable to ensure insulation between the shaft 5 and the sensor 10.

In embodiment 4 of the present disclosure, the sensor 10 is fixed to the shaft 5 via the insulating member 15. That is, insulation is ensured between the shaft 5 and the sensor 10. Thus, even in a case where shaft voltage as described above occurs, the sensor 10 does not become conductive to the shaft 5 and measurement can be continued.

Therefore, according to embodiment 4 of the present disclosure, with a simple configuration similar to embodiments 1 to 3 of the present disclosure, an effect of enabling improvement in accuracy for the internal temperature of the rotating electric machine 100 is provided, and in addition, an effect of keeping a stable measurement state is provided.

In embodiment 4 of the present disclosure, the case where the recess 51 is formed over the entire circumference of the shaft 5 has been shown. However, without limitation thereto, a configuration in which a part of the shaft 5 is recessed toward the radially inner side may be adopted. In either case, since the shaft 5 is solid toward the axis of the shaft 5 from the sensor 10 bonded to the shaft 5, the strength of the shaft 5 is kept.

In the above description, the case where a glass epoxy material is provided as the insulating member between the shaft 5 and the sensor 10 has been shown, but the present disclosure is not limited thereto. Any configuration may be adopted as long as a state in which the sensor 10 and the shaft 5 are insulated from each other via an insulating member can be established, while the sensor 10 is fixed to the shaft 5 by a resin material or the like, for example. Also in this case, the same effects as described above are provided.

Embodiment 5

Figure 9:
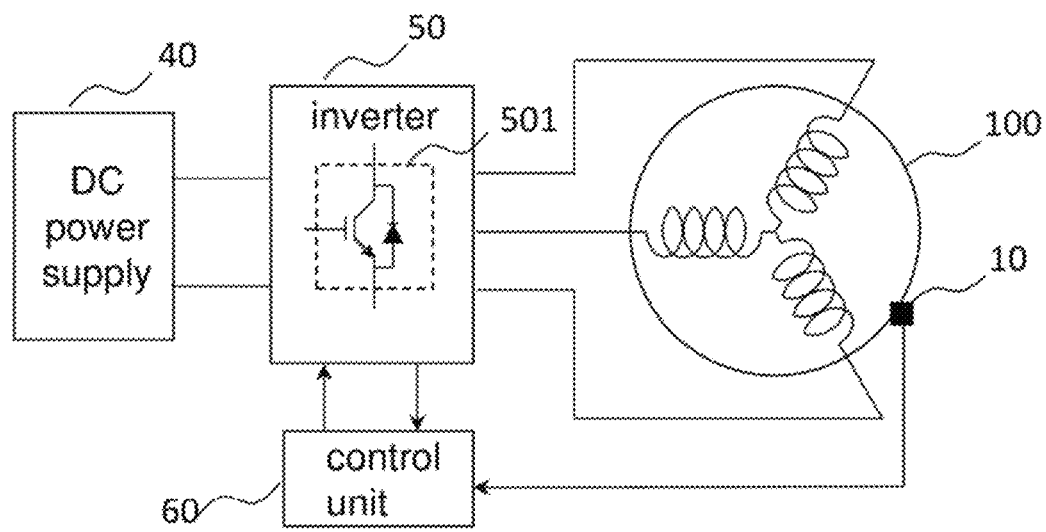
FIG. 9 is a schematic diagram of a rotating electric machine system according to embodiment 5 of the present disclosure.
Figure 10:
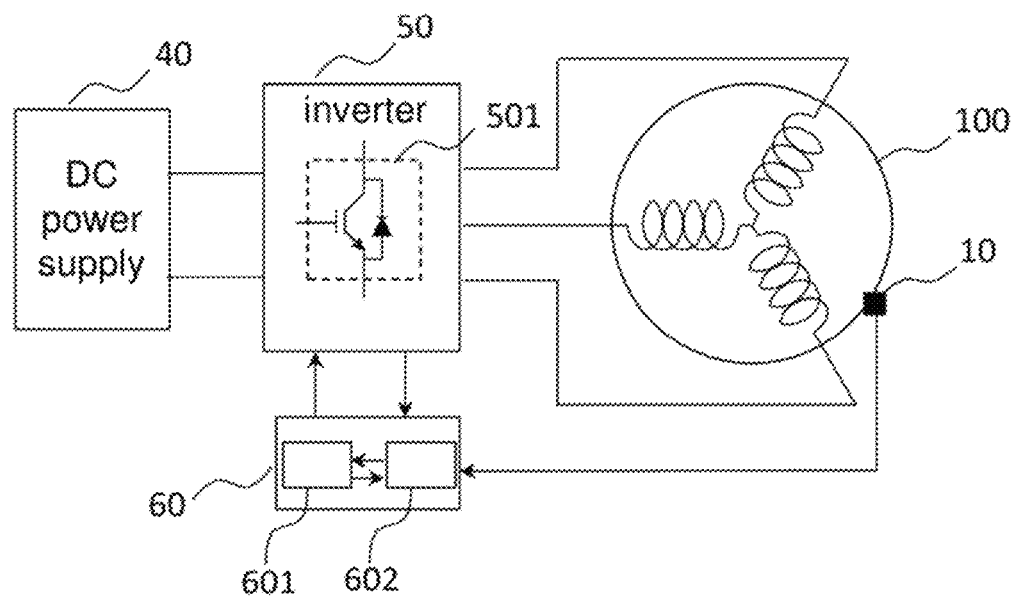
FIG. 10 is a hardware configuration diagram of the rotating electric machine system according to embodiment 5 of the present disclosure.
Figure 11:
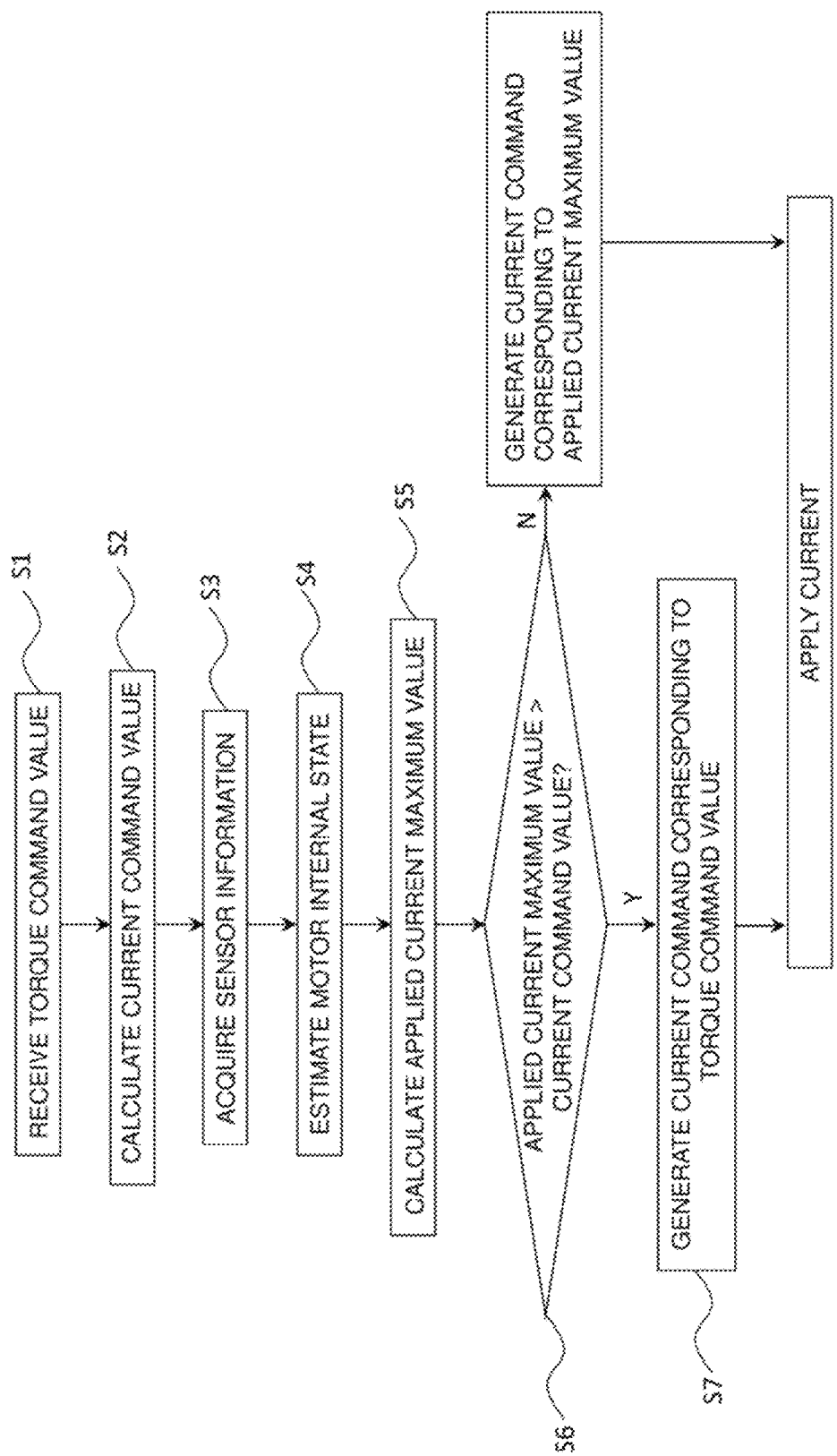
FIG. 11 is a control flowchart according to embodiment 5 of the present disclosure.
Figure 12:
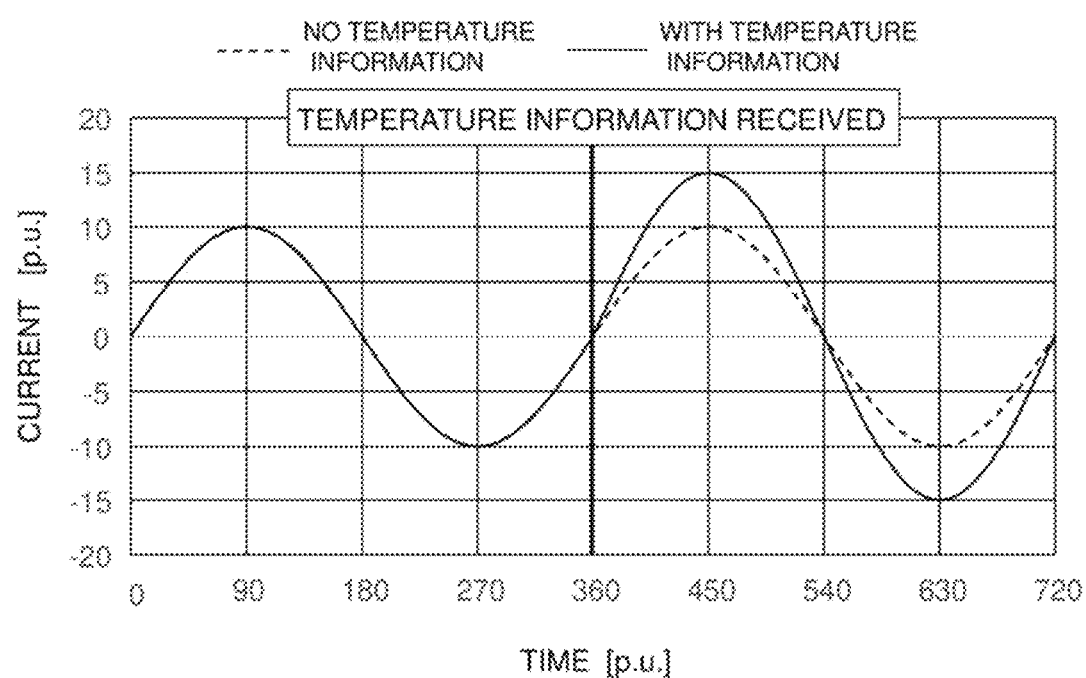
FIG. 12 shows an applied current waveform according to embodiment 5 of the present disclosure.

A rotating electric machine system according to embodiment 5 of the present disclosure will be described. The same reference characters as in FIG. 1 to FIG. 8 denote the same or corresponding parts and the description thereof is omitted. Only differences from embodiments 1 to 4 will be described. FIG. 9 is a schematic diagram of the rotating electric machine system according to embodiment 5 of the present disclosure. FIG. 10 is a hardware configuration diagram of the rotating electric machine system according to embodiment 5 of the present disclosure. FIG. 11 is a control flowchart according to embodiment 5 of the present disclosure. FIG. 12 shows an applied current waveform according to embodiment 5 of the present disclosure.

As shown in FIG. 9, a drive system in which the rotating electric machine 100 is incorporated includes the rotating electric machine 100, the DC power supply 40, the inverter 50, and a control unit 60. Electric energy is supplied from the DC power supply 40 to the inverter 50, and the switching element 501 in the inverter 50 performs switching, whereby current having a sine waveform or the like is supplied to the stator coil 4 in the rotating electric machine 100. The specific connection relationship among the DC power supply 40, the inverter 50, and the rotating electric machine 100 is the same as that described in embodiment 1, and therefore the description thereof is omitted.

The rotating electric machine system according to embodiment 5 of the present disclosure includes the control unit 60. The control unit 60 includes a reception unit and receives a signal from the sensor 10. Then, the control unit 60 transmits a control signal to the inverter 50 on the basis of the received signal from the sensor 10. The inverter 50 receives the control signal from the control unit 60, and supplies current to the rotating electric machine 100 on the basis of the control signal.

The control unit 60 further includes an estimation unit (not shown) for deriving the internal state of the rotating electric machine 100. The estimation unit estimates and calculates the internal state of the rotating electric machine 100, using a network model, for example. The above control signal is generated on the basis of the calculation in the estimation unit.

As shown in FIG. 10, the control unit 60 includes a processor 601 and a storage unit 602. The processor 601 performs the above processing by executing a program stored in the storage unit 602. Here, the storage unit 602 is formed by a memory storing necessary parameters, the program describing the above processing, and the like. The processor 601 is formed by a processor logically configured in a hardware circuit such as a microcomputer, a digital signal processor (DSP), or a field programmable gate array (FPGA). A plurality of processors 601 and a plurality of storage units 602 may cooperate with each other to execute the above function.

With reference to FIG. 11, operation of the control unit will be further described. In step 1 (S1), a torque command value is received from a high-order control unit (not shown). In step 2 (S2), a current command value corresponding to the torque command value is calculated. In step 3 (S3), the control unit 60 acquires sensor information via the transmission unit 12 by the sensor 10 provided to the rotating electric machine 100. In step 4 (S4), the internal state of the rotating electric machine 100 is estimated on the basis of the acquired sensor information. In step 5 (S5), an applied current maximum value allowable in the rotating electric machine 100 is calculated on the basis of the internal state estimation result. In step 6 (S6), the applied current maximum value and the above current command value are compared with each other. If the former one is greater, a current command corresponding to the torque command is generated (step 7 (S7)), and if the latter one is greater, a current command corresponding to the applied current maximum value is generated. In the last step, current is applied to the rotating electric machine 100 on the basis of a control signal that is the generated current command. The rotating electric machine 100 is driven through steps 1 to 7 and so on described above.

Next, with reference to FIG. 12, difference in command torque depending on presence/absence of temperature information will be described. The horizontal axis indicates time and the vertical axis indicates current. In FIG. 12, a solid line represents an applied current waveform in a case where temperature information is present and a dotted line represents an applied current waveform in a case where temperature information is not present.

In the case where temperature information is present, if the temperature of a target is lowered, it is possible to give a command for increasing torque by increasing a current command value, as long as the current is within a current amount that is originally physically allowable in the rotating electric machine 100. On the other hand, in the case where temperature information is not present, when the temperature of a target is lowered, it is impossible to recognize the temperature-reduced situation with comparatively high accuracy. Therefore, when the current command value is kept or increased, the increase amount is smaller than the increase amount in the above case where temperature information is present. Accordingly, it is desirable to perform control with temperature information taken into consideration. In addition, it is desirable to more accurately acquire the temperature information to be used for control.

In the conventional methods, a sensor is attached to a rotating electric machine and a sensor signal is merely monitored, whereby failure diagnosis, measurement, or the like is performed as needed. That is, it is not assumed that control using sensor information is performed to change a control operation point of the rotating electric machine 100 such as torque, the rotational speed, or output.

In embodiment 5 of the present disclosure, sensor information of the sensor 10 is transmitted to the control unit 60, and the control unit 60 generates a control signal on the basis of sensor information of the sensor 10. Thus, high-accuracy control can be performed. In addition, internal temperature distribution of the rotating electric machine 100 is derived by combining the thermal network model on the basis of the actual measured temperature of the shaft 5. With the internal temperature distribution, it becomes possible to recognize the temperature of each part having a temperature threshold, such as the stator coil 4, the first bearing 6, and the second bearing 7, for example. Then, by comparing the derived temperature of each part and the temperature threshold for the part, the control unit 60 generates a control signal so as to change to such a control operation point that allows further heat generation and temperature increase at each part. This control signal is generated on the basis of the internal temperature distribution.

Thus, the rotating electric machine 100 can change the control operation point on the basis of detected information from the sensor 10. Further, by using the actual measured temperature of the shaft 5 and the thermal network model, information corresponding to the boundary of the thermal network model can be acquired. Thus, it becomes possible to improve estimation accuracy for the internal state of the rotating electric machine 100 as compared to the conventional case of using only a physical model. Since estimation accuracy for the internal state is improved, it becomes possible to operate the rotating electric machine 100 in a range up to a point close to the temperature threshold for each motor part. It is noted that the temperature of each part may not necessarily be temperature information at that time, e.g., temperature distribution for a future time may be derived using the thermal network model and temperature information at the future time may be used.

Thus, according to embodiment 5 of the present disclosure, with a simple configuration similar to embodiments 1 to 4, an effect of enabling improvement in accuracy for the internal temperature of the rotating electric machine 100 is provided, and in addition, an effect of expanding the operation range of the rotating electric machine 100 is provided.

In embodiment 5 of the present disclosure, the case where the rotating electric machine 100 is driven has been shown, but without limitation thereto, the rotating electric machine 100 may be configured to generate electric power. In the case of electric generation, the rotating electric machine 100 converts mechanical energy to electrical energy, and the electrical energy is stored into the DC power supply 40 via the inverter 50. Also in this case, the same effects are provided.

Embodiment 6

Figure 13:
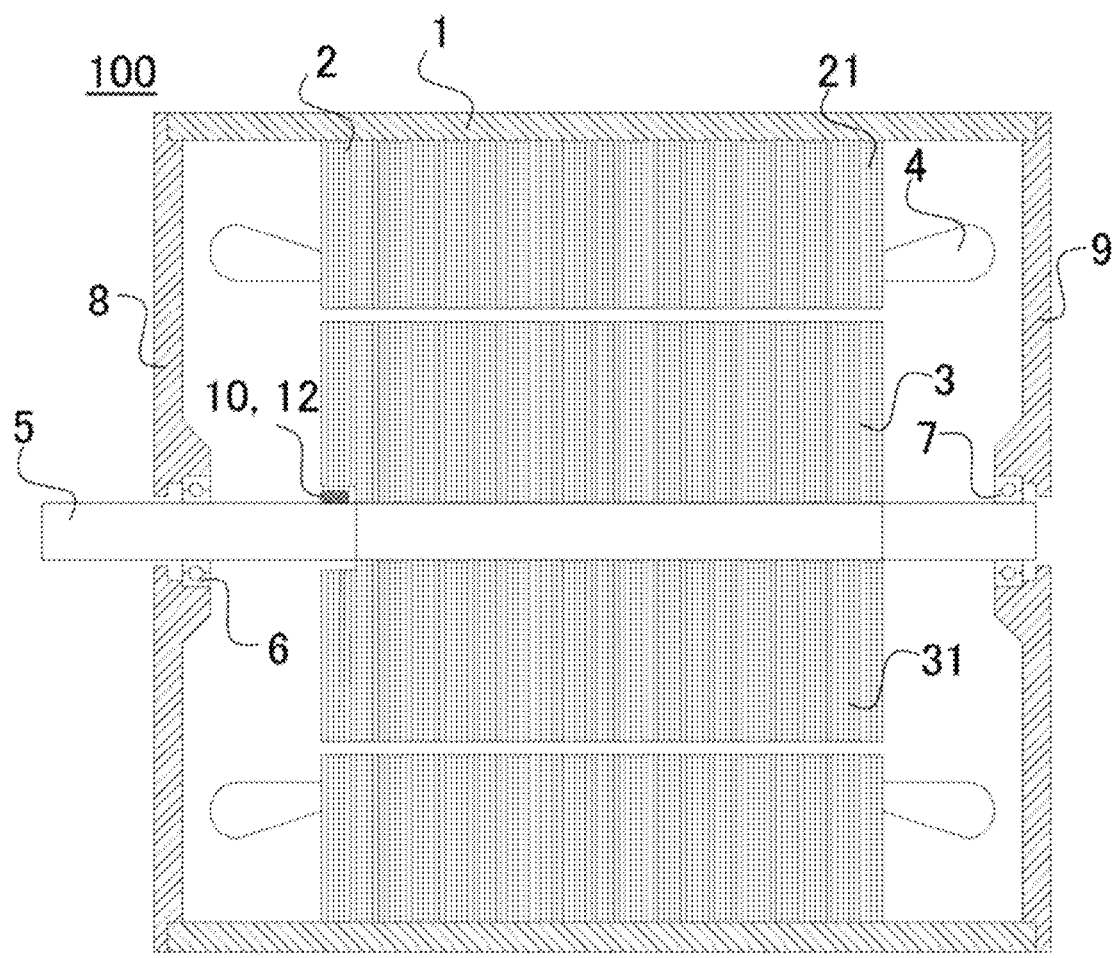
FIG. 13 is a vertical sectional view showing a rotating electric machine according to embodiment 6 of the present disclosure.

A rotating electric machine according to embodiment 6 of the present disclosure will be described. The same reference characters as in FIG. 1 to FIG. 12 denote the same or corresponding parts and the description thereof is omitted. Only differences from embodiments 1 to 5 will be described. FIG. 13 is a vertical sectional view showing the rotating electric machine according to embodiment 6 of the present disclosure.

As shown in FIG. 13, the rotor core 31 is formed such that the diameter of the shaft insertion hole at an axial end surface thereof is large. Specifically, electromagnetic steel sheets having a large shaft insertion hole diameter are stacked on the axial end side of the rotor core 31. Thus, a space is formed at a certain part in the radial direction between the rotor core 31 and the shaft 5. Then, as shown in FIG. 13, the sensor 10 is attached so as to be stored within the space between the rotor core 31 and the shaft 5.

Thus, it is possible to measure the temperature at a part closer to the rotor core 31. In addition, the influence when the sensor 10 is exposed to air inside the rotating electric machine 100 can be reduced. Therefore, it becomes possible to accurately acquire information about the surface of the shaft 5 just close to the rotor core 31. In addition, even in a case where the distance between the rotor core 31 and the first bearing 6 is short, the mounting space for the sensor 10 can be ensured.

Therefore, according to embodiment 6 of the present disclosure, with a simple configuration similar to embodiments 1 to 5, an effect of enabling improvement in accuracy for the internal temperature of the rotating electric machine 100 is provided, and in addition, the sensor 10 can be attached even in a case where the axial length of the shaft 5 is short, and information can be acquired more accurately.

In the above description, the case where the stacked steel sheets at the end of the rotor core 31 have a large shaft insertion hole diameter has been shown. However, instead of expanding the whole circumference, the diameter may be enlarged only at a part of the circumference in accordance with the size of the sensor 10. Alternatively, in a case of using the rotor core 31 that is not a sheet-stacked type, or after identical steel sheets are stacked, the rotor core 31 may be worked to form a space for mounting the sensor 10. In addition, although the sensor 10 is stored within the space between the rotor core 31 and the shaft 5 in the above description, the space may have such a size that a part of the sensor 10 is stored. Also in such cases, the same effects as described above are provided.

It is noted that the above embodiments may be freely combined with each other or each of the above embodiments may be modified or simplified as appropriate.

DESCRIPTION OF THE REFERENCE CHARACTERS 2 stator
3 rotor
4 stator coil
5 shaft
6 first bearing
7 second bearing
8 first bracket
9 second bracket
10 sensor
11 lead wire
12 transmission unit
14 retention member
15 insulating member
21 stator core
31 rotor core
40 DC power supply
50 inverter
51 recess
52 shaft groove
60 control unit
100 rotating electric machine
501 switching element
601 processor
602 storage unit

The invention claimed is:

1. A rotating electric machine system comprising:
a rotating electric machine; and
a control circuit for controlling power to be supplied to the rotating electric machine, wherein
the rotating electric machine includes
a stator,
a rotor rotatably provided on a radially inner side of the stator,
a shaft provided as a rotary shaft of the rotor,
a bracket supporting the shaft rotatably relative to the stator via a bearing, and
a sensor which is provided at a radially outer surface of the shaft between the rotor and the bearing, and measures a temperature of the shaft, and
the control circuit estimates an internal state of the rotating electric machine on the basis of a thermal network model and temperature information of the shaft between the rotor and the bearing acquired by the sensor, wherein
the shaft has a groove recessed toward a radially inner side of the shaft and extending in an axial direction thereof, and
a lead wire for transmitting information measured by the sensor is led through the groove.

2. The rotating electric machine system according to claim 1, wherein
the shaft is solid in a direction toward an axis thereof from a position where the sensor is attached.

3. The rotating electric machine system according to claim 1, wherein
a radially outer surface of the shaft has a recess between the rotor and the bearing, and
the sensor is stored in the recess.

4. The rotating electric machine system according to claim 3, wherein
the shaft has a retention member covering the sensor from a radial direction.

5. The rotating electric machine system according to claim 1, wherein
the sensor is attached to the shaft via an insulating member.

6. The rotating electric machine system according to claim 1 wherein
the rotating electric machine includes a transmission circuit which acquires a signal from the sensor and transmits a corresponding signal, and
the control circuit performs control on the basis of information from the transmission circuit.

7. The rotating electric machine system according to claim 6, wherein the control circuit includes
a reception circuit for receiving the signal from the transmission circuit, and
an estimation circuit for estimating an internal state of the rotating electric machine on the basis of information from the reception circuit, and
the control circuit performs control on the basis of information estimated by the estimation circuit.

8. The rotating electric machine system according to claim 1, wherein
the control circuit estimates a temperature inside the rotating electric machine on the basis of the thermal network model using, as a boundary condition, the temperature information acquired by the sensor provided to the shaft.

9. The rotating electric machine system according to claim 8, wherein
the control circuit estimates the internal state of the rotating electric machine and controls current application to the rotating electric machine on the basis of estimated information.

10. The rotating electric machine system according to claim 1, wherein
the control circuit estimates the internal state of the rotating electric machine and controls current application to the rotating electric machine on the basis of estimated information.

11. The rotating electric machine system according to claim 1, wherein
the control circuit predicts temperature change inside the rotating electric machine on the basis of the thermal network model using, as a boundary condition, the temperature information acquired by the sensor provided to the shaft.

12. The rotating electric machine system according to claim 1, wherein
the sensor is provided at the radially outer surface of the shaft between the rotor and the bearing, the sensor being separated from the rotor.

13. The rotating electric machine system according to claim 1, wherein
the rotor and the stator are surrounded by a cylindrical frame and the brackets provided on both end sides in an axial direction of the frame, and
the sensor is located between the rotor and the bearing in a space surrounded by the frame and the brackets.

14. The rotating electric machine system according to claim 1, wherein
the sensor is located in a radial-direction space between the rotor and the shaft.

15. The rotating electric machine system according to claim 1, wherein
the sensor is provided directly on the radially outer surface of the shaft between the rotor and the bearing.

16. A rotating electric machine system comprising:
a rotating electric machine; and
a control circuit for controlling power to be supplied to the rotating electric machine, wherein
the rotating electric machine includes
a stator,
a rotor rotatably provided on a radially inner side of the stator,
a shaft provided as a rotary shaft of the rotor,
a bracket supporting the shaft rotatably relative to the stator via a bearing, and
a sensor which is provided at a radially outer surface of the shaft between the rotor and the bearing, and measures a temperature of the shaft, and
the control circuit estimates an internal state of the rotating electric machine on the basis of a thermal network model and temperature information of the shaft between the rotor and the bearing acquired by the sensor, wherein
the sensor is located in a radial-direction space between the rotor and the shaft.

* * * * *